(12) United States Patent
Sato

(10) Patent No.: US 10,165,151 B2
(45) Date of Patent: Dec. 25, 2018

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Kei Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/206,038

(22) Filed: Jul. 8, 2016

(65) Prior Publication Data

US 2017/0013170 A1     Jan. 12, 2017

(30) Foreign Application Priority Data

Jul. 10, 2015   (JP) .................................. 2015-138895

(51) Int. Cl.
| | | |
|---|---|---|
| *G06F 15/00* | (2006.01) | |
| *H04N 1/44* | (2006.01) | |
| *G06F 21/31* | (2013.01) | |
| *H04N 1/00* | (2006.01) | |

(52) U.S. Cl.
CPC ........... *H04N 1/4433* (2013.01); *G06F 21/31* (2013.01); *H04N 1/00413* (2013.01); *H04N 1/00482* (2013.01); *H04N 1/4413* (2013.01); *H04N 2201/0094* (2013.01)

(58) Field of Classification Search
CPC .. H04N 1/443; H04N 1/00413; H04N 1/4413; H04N 1/00482; H04N 2201/0094; G06F 21/31
USPC ....................................................... 358/1.15
See application file for complete search history.

(56) References Cited

U.S. PATENT DOCUMENTS

| | | | | |
|---|---|---|---|---|
| 2010/0325177 A1* | 12/2010 | Hibino | ................ | G06F 21/6218 707/812 |
| 2011/0164271 A1* | 7/2011 | Kamimura | ......... | H04N 1/00408 358/1.14 |
| 2014/0026209 A1* | 1/2014 | Asahara | .................. | G06F 21/31 726/16 |

FOREIGN PATENT DOCUMENTS

JP      2012-254618 A     12/2012

* cited by examiner

*Primary Examiner* — Saeid Ebrahimi Dehkord
(74) *Attorney, Agent, or Firm* — Canon U.S.A., Inc. IP Division

(57) ABSTRACT

An information processing apparatus stores, as user information of a user capable of logging into the information processing apparatus, first user information of a user having particular authority and second user information of a user having no particular authority. The information processing apparatus displays a list of, from the stored user information, user information that includes the second user information and no first user information. Then, the information processing apparatus performs a login process enabling a user corresponding to user information selected from the list to log into the information processing apparatus.

18 Claims, 9 Drawing Sheets

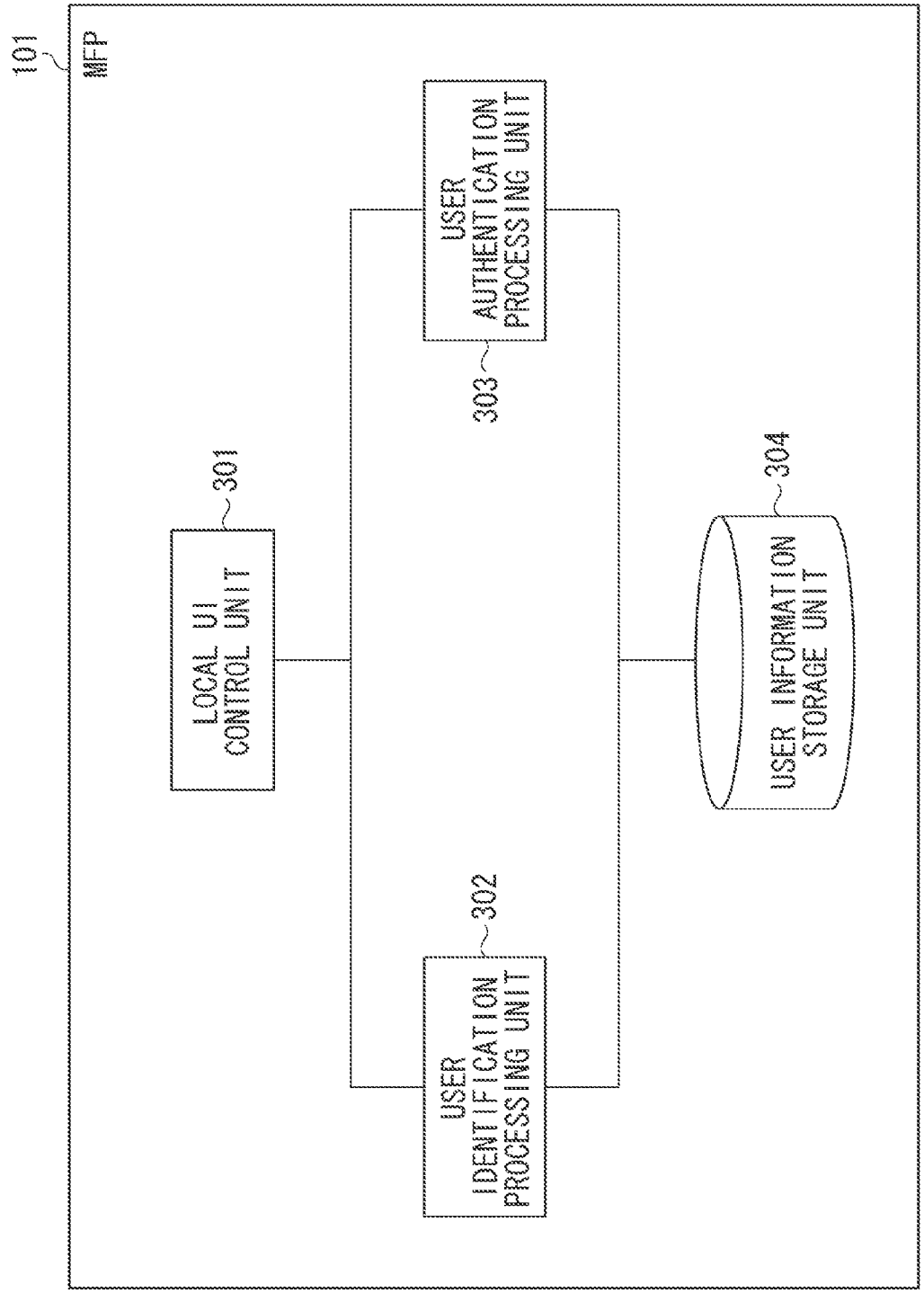

FIG. 9

| PERSONAL PRINT | | | | |
|---|---|---|---|---|
| YYY | | | | |
| DOCUMENT NAME | NUMBER OF PAGES | NUMBER OF COPIES | TIME | |
| DOCUMENT 1.doc | 10 | 1 | 15:00 | |
| DOCUMENT 2.pdf | 100 | 2 | 16:25 | |
| | | | | |
| | | | | |
| | | | | |
| SELECT ALL | DELETE | START PRINTING | | |

INFORMATION PROCESSING APPARATUS, METHOD FOR CONTROLLING INFORMATION PROCESSING APPARATUS, AND STORAGE MEDIUM

BACKGROUND

Field

Aspects of the present invention generally relate to an information processing apparatus, a method for controlling the information processing apparatus, and a storage medium.

Description of the Related Art

A multifunction peripheral (MFP) having a plurality of applications for copying, printing, and transmitting a scanned image is known. Further, in recent years, due to an increase in security consciousness, many MFPs have included user authentication functionality. For example, enabling use of an MFP by inputting a user name and password.

In order to use the user authentication functionality, a user needs to input a user name and password using an operation panel of an MFP to log into the MFP. This can impact operability of the MFP for a user who wishes to immediately use the MFP. Further, the load of system environment settings is also high.

There is a need for a method that would enable a user trusted by an administrator to log into an MFP without inputting various pieces of information such as a user name and password. Along this line, Japanese Patent Application Laid-Open No. 2012-254618 discusses an MFP that displays, on an operation panel, a list of user information, e.g., user names, associated with registered users that are capable of logging into the MFP. This enables users to log into the MFP by selecting their user information from the list.

However, depending on the installation environment of the MFP, there may be instances where it is operationally undesirable to allow a user to log into the MFP by merely selecting user information without inputting a user name and password. For example, a user with administrator authority can change important settings of the MFP. Thus, if user information of such a user is also uniformly displayed, there is a risk that anyone can log into the MFP as an administrator, and an unintended change can be made to settings of the MFP. This can occur not only in an MFP, but also other information processing apparatuses, such as a personal computer (PC).

SUMMARY

According to an aspect of the present invention, an information processing apparatus includes a storage unit configured to store, as user information of a user capable of logging into the information processing apparatus, first user information of a user having particular authority and second user information of a user having no particular authority, a display control unit configured to display a list of, from the user information stored in the storage unit, user information including the second user information but not first user information, and a login processing unit configured to perform a login process that, according to selection of user information from the list, enables a user corresponding to the selected user information to log into the information processing apparatus.

Further features of aspects of the present invention will become apparent from the following description of exemplary embodiments with reference to the attached drawings.

BRIEF DESCRIPTION OF THE DRAWINGS

FIG. 3 is a block diagram illustrating a software configuration of the MFP.

FIG. 9 is a diagram illustrating an exemplary screen of a personal print function.

DESCRIPTION OF THE EMBODIMENTS

With reference to the drawings, exemplary embodiments of the present invention will be described in detail below. The following exemplary embodiments do not limit the aspects of the invention according to the appended claims, and not all the combinations of the features described in the exemplary embodiments are essential for implementing the aspects of the invention.

<System Configuration>

Figure 1:
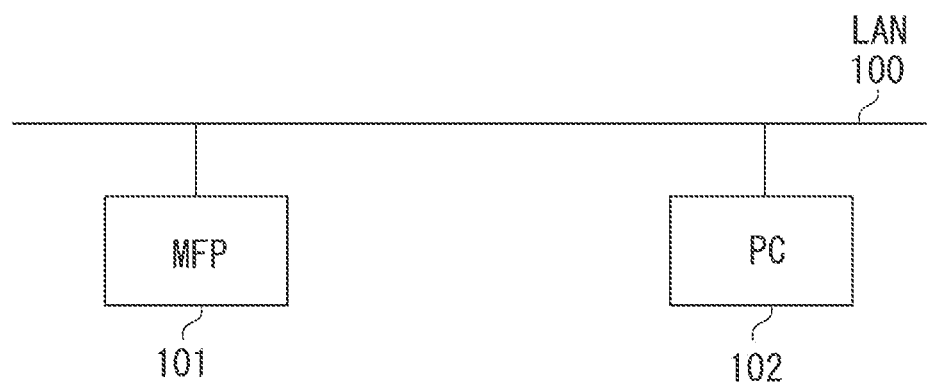
FIG. 1 is a diagram illustrating an overall configuration of a system.

FIG. 1 is a diagram illustrating an overall configuration of a system related to a multifunction peripheral (MFP) 101, which is an image forming apparatus. The MFP 101 and a personal computer (PC) 102 are connected to each other via a local area network (LAN) 100, enabling the MFP 101 and the PC 102 to communicate with each other. The PC 102 can transmit a print job to the MFP 101 via the LAN 100. The MFP 101 includes at least a personal print function. That is, the MFP 101 can reserve a print job transmitted from the PC 102. Then, if a user logs into the MFP 101, the MFP 101 can display a list of jobs submitted by the user, receive a print instruction from the user, and perform printing.

<Hardware Configuration>

Figure 2:
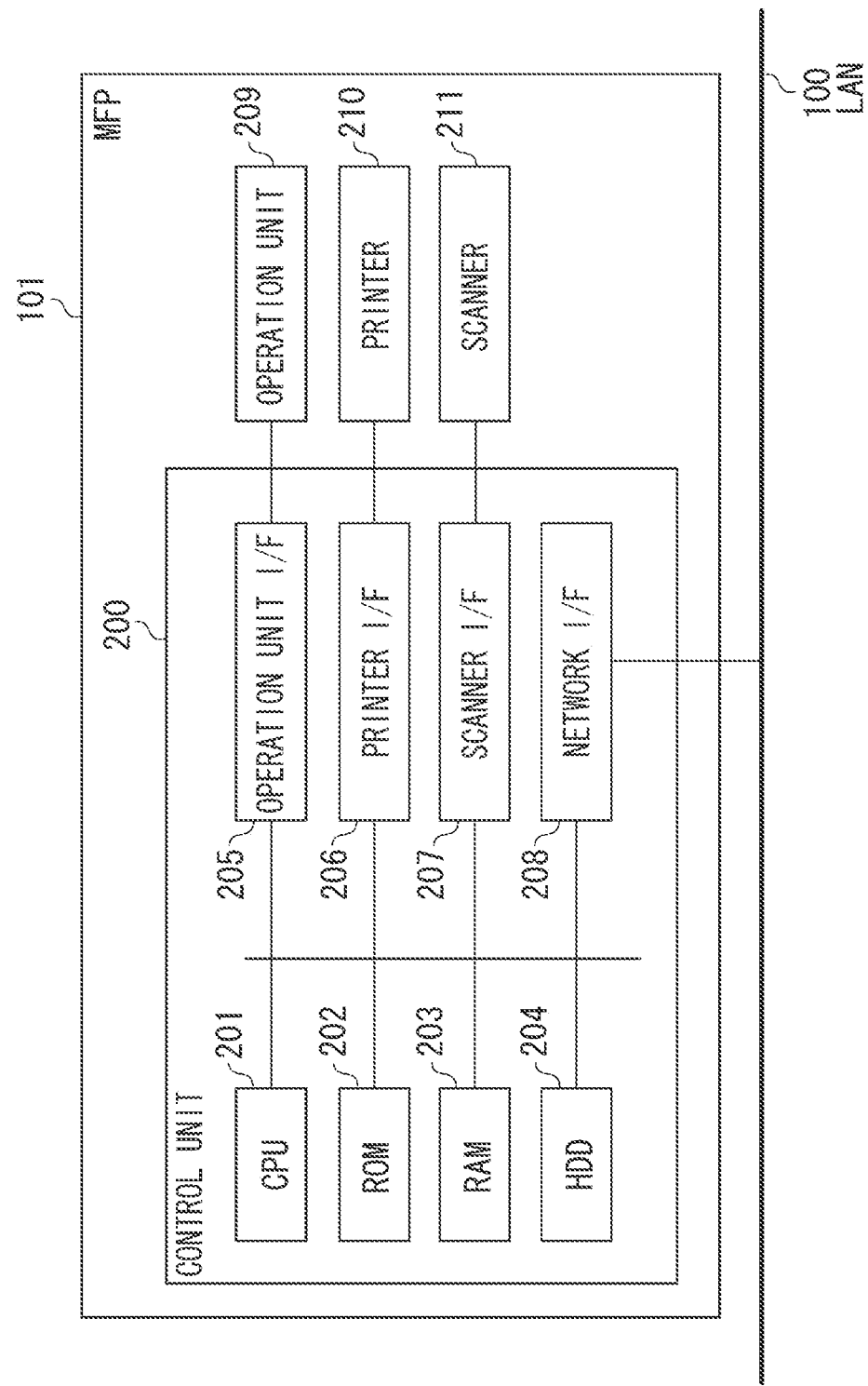
FIG. 2 is a block diagram illustrating a hardware configuration of a multifunction peripheral (MFP).

FIG. 2 is a block diagram illustrating a hardware configuration of the MFP 101. A control unit 200, which includes a central processing unit (CPU) 201, controls an operation of the MFP 101. The CPU 201 reads control programs stored in a read-only memory (ROM) 202 and performs various types of control, such as reading and transmission control. A random-access memory (RAM) 203, such as a main memory or work area for the CPUS 201, is used as a temporary storage area. A hard disk drive (HDD) 204 stores image data and various programs, or stores various types of data as described below. An operation unit interface (I/F) 205 is an interface for connecting an operation unit 209 and the control unit 200.

A printer I/F 206 is an interface for connecting a printer 210 and the control unit 200. Image data to be printed by the printer 210 is transferred from the control unit 200 to the printer 210 via the printer I/F 206 and printed on a recording medium by the printer 210.

A scanner I/F 207 is an interface for connecting a scanner 211 and the control unit 200. The scanner 211 reads an image on a document to generate image data, and inputs the generated image data to the control unit 200 via the scanner I/F 207.

A network I/F 208 is an interface for connecting the control unit 200 (the MFP 101) to the LAN 100. The network I/F 208 transmits and receives various pieces of information (e.g., a print job from the PC 102) to and from an external apparatus (e.g., the PC 102) on the LAN 100.

<Software Configuration>

FIG. 3 is a block diagram illustrating a software configuration of the MFP 101. Each processing unit is a function provided by a control program stored in the ROM 202.

A local user interface (UI) control unit 301 provides a function of controlling the operation unit 209 via the operation unit I/F 205. The local UI control unit 301 notifies a user identification processing unit 302 or a user authentication processing unit 303 of the content of an operation performed by a user through the operation unit 209. Further, the local UI control unit 301 receives a screen display request from the user identification processing unit 302 or the user authentication processing unit 303, and performs control to display a screen on the operation unit 209. In other words, the user identification processing unit 302 or the user authentication processing unit 303 displays a screen on the operation unit 209 via the local UI control unit 301.

The user identification processing unit 302 provides a function of identifying users to use the MFP 101 and enabling each user to use various functions of the MFP 101. To allow the selection of a user to use the MFP 101, the user identification processing unit 302 displays on the operation unit 209 a user selection screen 400 illustrated in FIGS. 4A to 4C. The user identification processing unit 302 acquires user names from a user information storage unit 304 and displays a list of buttons corresponding to the acquired user names on the user selection screen 400. Further, according to the contents of settings made on a setting screen 600 illustrated in FIG. 6, the user identification processing unit 302 can switch the displaying and hiding of buttons to be displayed on the user selection screen 400.

Figure 5:
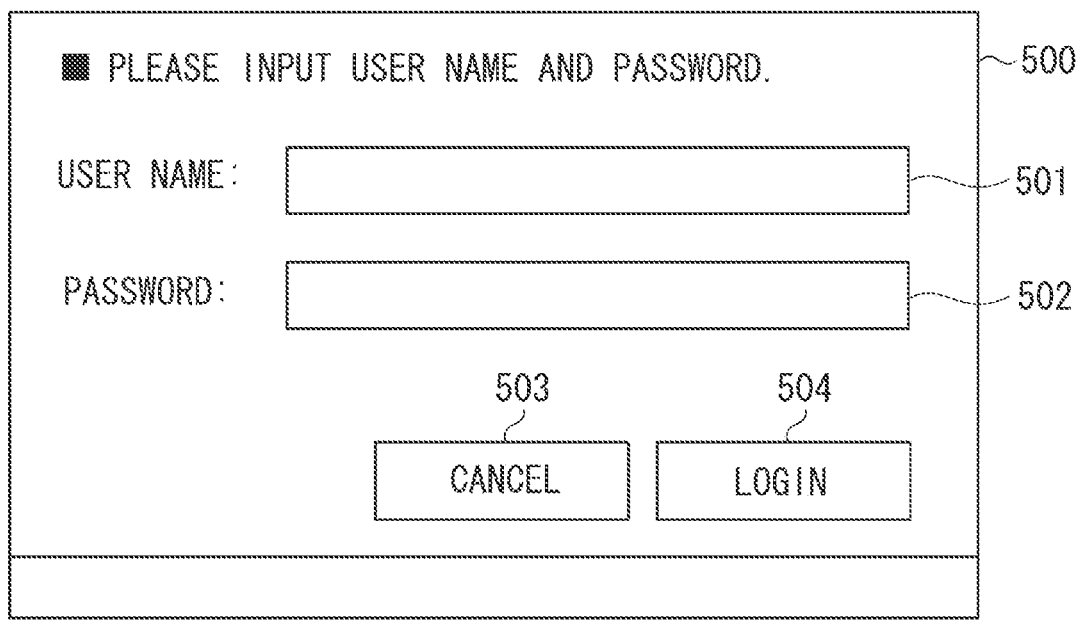
FIG. 5 is a diagram illustrating an exemplary screen of a user authentication screen.

The user authentication processing unit 303 provides a function of authenticating a user to use the MFP 101. The user authentication processing unit 303 displays a user authentication screen 500 on the operation unit 209 as illustrated in FIG. 5. The user authentication processing unit 303 receives an input of a user name and password from a user through the user authentication screen 500 and compares the user name and the password with user information stored in the user information storage unit 304, thereby authenticating the user.

The user information storage unit 304 stores user information regarding a user capable of using the MFP 101. User information registered through a user registration screen (not illustrated) can be stored in the user information storage unit 304. As described in more detail below, buttons corresponding to all the users stored in the user information storage unit 304 are displayed on the user selection screen 400 unless a special setting is made. Table 1 illustrates an example of a user information table stored in the user information storage unit 304.

TABLE 1

| User Name | Password | Role |
|---|---|---|
| Admin | 7654321 | Administrator |
| XXX | abc | General User |

TABLE 1-continued

| User Name | Password | Role |
|---|---|---|
| YYY | def | General User |
| ZZZ | ghi | Administrator |

The user information table includes a user name, a password, and a role. The user name is user identification information for uniquely identifying a user. On the user selection screen 400, a button corresponding to the user name is displayed. The password is information used to authenticate a user, and any value can be set with respect to each user. As described below, a user can log into the MFP 101, on the user authentication screen 500, according to the input of a user name and password. On the other hand, on the user selection screen 400, it is not necessary to input a user name and password, and a user can log into the MFP 101 as a particular user by pressing (selecting) a button corresponding to the user's name. The setting of a password is optional. For example, a password may not be set for a user who logs into the MFP 101 only through the user selection screen 400. The role is information indicating authority to be given to the user of the MFP 101. In the present embodiment, the role includes two types, "Administrator" and "General User". In other embodiments, additional roles can be used. "Administrator" is a role assigned to a user with administrator authority on the MFP 101 (hereinafter, an "administrator user"). "General User" is a role assigned to a general user of the MFP 101. The MFP 101 can limit functions for a user logged into the MFP 101 based on the role assigned to the user. An administrator user is a user capable of changing particular settings of the MFP 101, such as user management and security settings. A general user is a user incapable of changing the particular settings an administrator user can change. In the present example, the user names "Admin" and "ZZZ" are registered as administrator users, and the user names "XXX" and "YYY" are registered as general users. The user name "Admin" is a default administrator user prepared as an account for an administrator when the MFP 101 was shipped from a factory.

<Exemplary Screens>

Figure 4A:
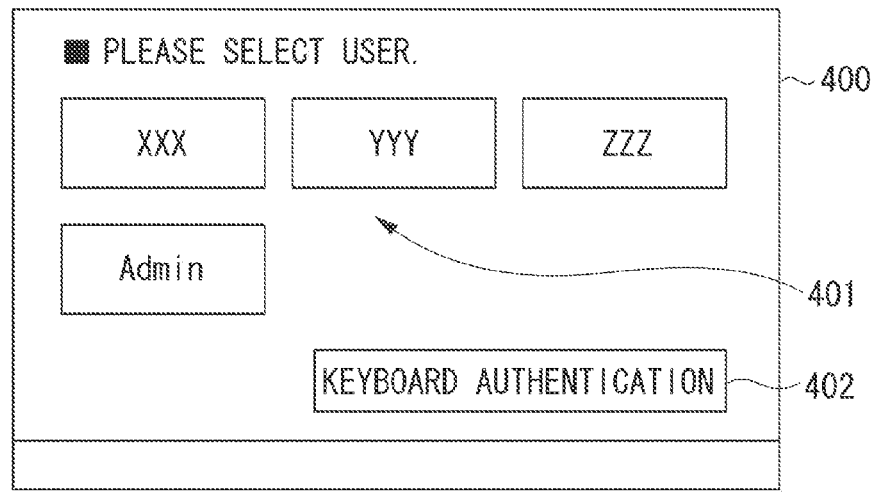
FIGS. 4A, 4B, and 4C are diagrams illustrating exemplary screens of a user selection screen.
Figure 4B:
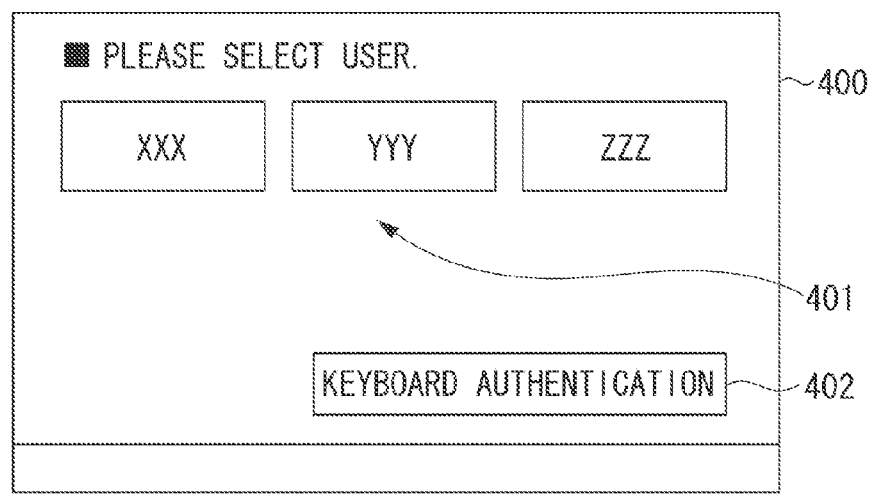
Figure 4C:
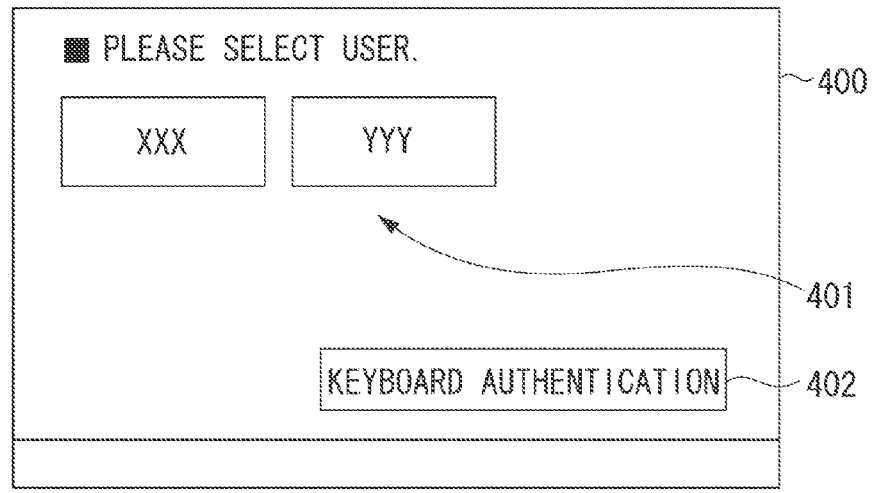

FIGS. 4A to 4C are diagrams illustrating exemplary screens of the user selection screen 400 enabling the selection of a user to log into the MFP 101. The user selection screen 400 is an initial screen displayed on the operation unit 209 when the MFP 101 starts.

Figure 7:
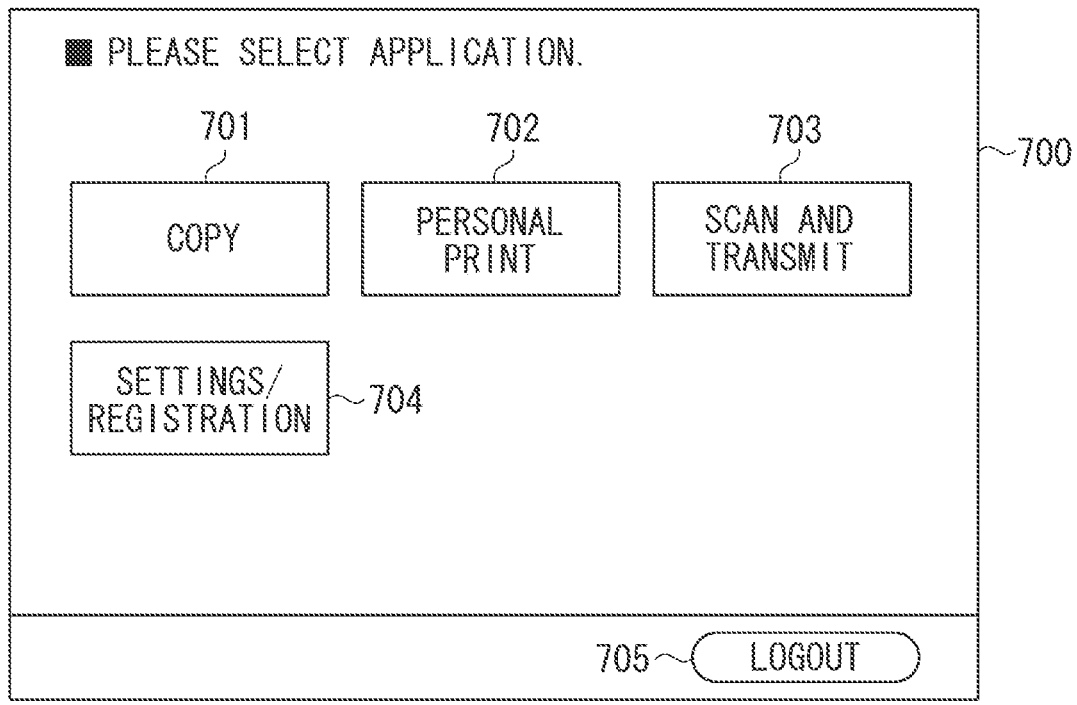
FIG. 7 is a diagram illustrating an exemplary screen of a function selection screen.

Buttons 401, which respectively correspond to user names, and a "keyboard authentication" button 402 are displayed on the user selection screen 400. The user names displayed on the buttons 401 are acquired from the user information storage unit 304. If any one of the buttons 401 is pressed by a user, a login process causing the selected user to log into the MFP 101 is performed. After the login process is completed, a function selection screen 700 illustrated in FIG. 7 is displayed. If the "keyboard authentication" button 402 is pressed, the user authentication processing unit 303 requests the local UI control unit 301 to display the user authentication screen 500. According to the display request from the user authentication processing unit 303, the local UI control unit 301 displays the user authentication screen 500 on the operation unit 209.

FIG. 5 is a diagram illustrating an exemplary screen of the user authentication screen 500. The user authentication screen 500 is for receiving input of a user name and password to use the user authentication function of the MFP 101. A user name area 501 is a field for a user of the MFP 101 to input a user name. A password area 502 is a field for the user of the MFP 101 to input a password. A "login" button 504 is for giving an instruction to log into the MFP 101. If the "login" button 504 is pressed, the user authentication processing unit 303 authenticates the user by confirming whether the combination of the user name and the password input through the operation unit 209 is present in the user information stored in the user information storage unit 304. If the user is successfully authenticated, a login process for causing the authenticated user to log into the MFP 101 is performed. Then, the function selection screen 700 is displayed. The "cancel" button 503 is for canceling user authentication performed on the user authentication screen 500. If the "cancel" button 503 is pressed by the user, the screen transitions to the user selection screen 400.

FIG. 7 is a diagram illustrating an exemplary screen of the function selection screen 700 for selecting a function to be used from among the functions included in the MFP 101. On this exemplary screen, there are buttons for giving instructions to start various applications, such as a "copy" button 701, a "personal print" button 702, a "scan and transmit" button 703, and a "settings/registration" button 704 for giving an instruction to display a "settings/registration" menu. If a button for each function on the function selection screen 700 is pressed, a screen for the function corresponding to the pressed button is presented. For example, if the "personal print" button 702 is pressed, a personal print application starts, and a screen illustrated in FIG. 9 is displayed on the operation unit 209. If the "settings/registration" button 704 is pressed, a "settings/registration" menu screen (not illustrated) is displayed, and it is possible to make various settings and perform registration regarding the MFP 101. If a user logs into the MFP 101 as an administrator user, of which the role is "Administrator", the "settings/registration" menu screen transitions to various "settings/registration" screens, whereby it is possible to change particular settings, such as user management and security settings. To permit only an administrator to change not only particular settings, but also all the settings of the MFP 101, a "settings/registration" button may be displayed on the function selection screen 700 only when the role of a user having logged into the MFP 101 is "Administrator". A "logout" button 705 is for giving an instruction to log out of the MFP 101. If the "logout" button 705 is pressed, a logout process is performed, and the screen transitions to the user selection screen 400.

FIG. 9 is a diagram illustrating an exemplary screen of a job list screen 900, which is displayed in a case where, after a login process is performed for the user name "YYY", the "personal print" button 702 is pressed on the function selection screen 700. As a print job list 901, a list of print jobs submitted from the PC 102 and associated with the user name "YYY" are reserved and displayed. The MFP 101 thus has a personalization function for providing an appropriate function according to a user logged into the MFP 101. The user selects any document from the print job list 901 and presses a "start printing" button 904. Accordingly, printing can be performed using the printer 210. Further, the user selects any document and presses a "delete" button 903, and thereby deletes any job from the print job list 901. When selecting a print job to be printed or deleted, selection of the "select all" button 902 results in selection of all the print jobs at once.

Returning to FIGS. 4A to 4C, FIG. 4A is a diagram illustrating an exemplary screen of the user selection screen 400 in a case where the buttons corresponding to all the user names stored in the user information storage unit 304 are displayed.

As described above, to log into the MFP 101 through the user authentication screen 500, a user needs to input a user name and password. On the other hand, to log into the MFP 101 through the user selection screen 400, it is not necessary to input a user name and password, and a user need only press a button 401 corresponding to the user's name. Accordingly, the user can log into the MFP 101 as a user having a particular user name. Thus, anyone could log into the MFP 101 as an administrator by pressing a button assigned to an administrator user. If a user logs into the MFP 101 as an administrator, the user can change important settings of the MFP 101, such as user management and security settings. As a result, there is a possibility that an operationally undesirable setting, unintended by an actual administrator, is made. According to the present exemplary embodiment, a description is provided of a method for hiding a button corresponding to an administrator user on the user selection screen 400 to enable an appropriate operation according to the installation environment.

Figure 6:
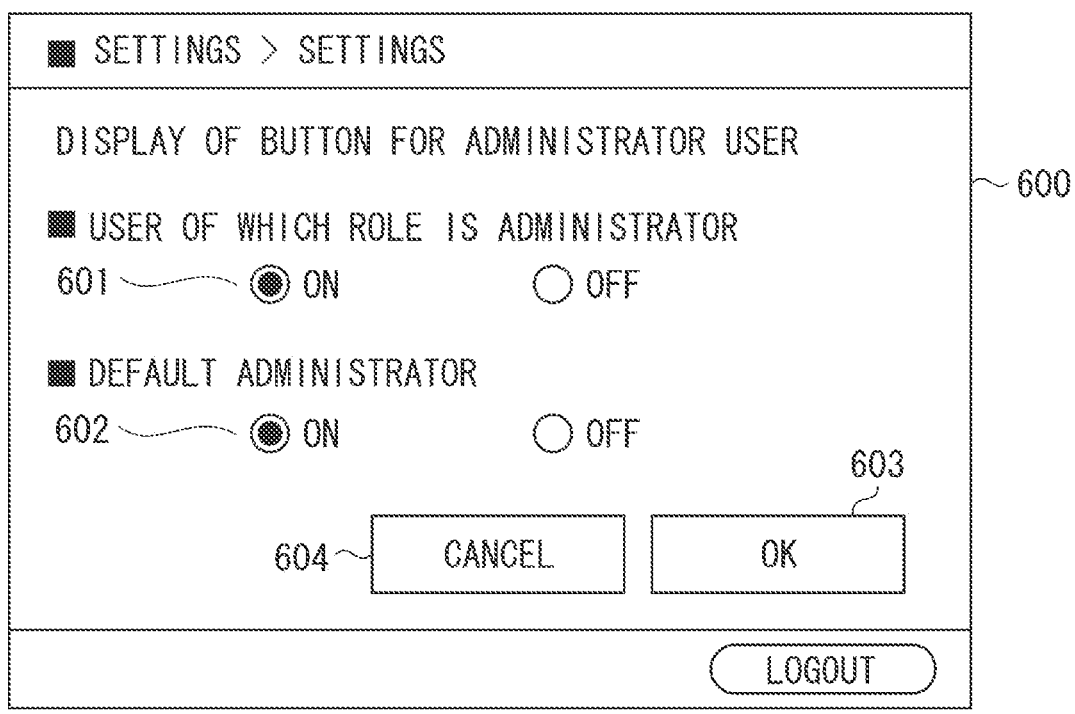
FIG. 6 is a diagram illustrating an exemplary screen of a setting screen for setting whether to display or hide buttons corresponding to administrator users.

FIG. 6 is a diagram illustrating an exemplary screen of the setting screen 600, on which an administrator sets whether to display or hide buttons corresponding to the administrator users on the user selection screen 400. The setting screen 600 is displayed on the operation unit 209 via the above "settings/registration" menu screen displayed when the "settings/registration" button 704 is pressed. The setting screen 600 is displayed only when a user logs into the MFP 101 as an administrator user.

A radio button 601 is used to switch the displaying and hiding of a button associated with a user with the administrator authority. The user having the administrator authority refers to a user with a role assigned to "Administrator" in the user information stored in the user information storage unit 304. It is possible, by selecting "OFF" in the radio button 601, to make a setting so that buttons for users having the administrator authority are not displayed on the user selection screen 400.

A radio button 602 is used to switch the displaying and hiding of a button for a default administrator user. As described above, in the present exemplary embodiment, the user name "Admin" is the default administrator user. In this case, the state of being the default administrator user is determined based on the user name. Alternatively, a flag indicating the state of being the default administrator user may be provided as user information, and the displaying and hiding of the button may be switched according to the flag. If "OFF" is selected in the radio button 601, "OFF" is automatically selected in the radio button 602 and cannot be changed to "ON". This is because users having the administrator authority include the default administrator user. If, on the other hand, "ON" is selected in the radio button 601, it is possible, by selecting "OFF" in the radio button 602, to make a setting so that from among users having the administrator authority, only the default user is not displayed on the user selection screen 400.

An "OK" button 603 is for finalizing the values set on the setting screen 600. If a user presses this button, the setting values selected in the radio buttons 601 and 602 are saved in the HDD 204. A "cancel" button 604 is for canceling the contents of the settings made on the setting screen 600. If the "cancel" button 604 is pressed, the contents of the settings changed on the setting screen 600 are not saved in the HDD 204, and the screen transitions to the previous screen or the function selection screen 700.

FIG. 4B is a diagram illustrating an exemplary screen of the user selection screen 400 in a case where "ON" is selected in the radio button 601, and "OFF" is selected in the radio button 602. In this case, the button associated with the default administrator user (the user name "Admin") is not displayed.

FIG. 4C is a diagram illustrating an exemplary screen of the user selection screen 400 in a case where "OFF" is selected in the radio button 601. In this case, the buttons associated with all the users having the administrator authority (the user names "ZZZ" and "Admin") are not displayed.

If "ON" is selected in the radio button 601, and "ON" is selected in the radio button 602, the buttons for all the users are displayed on the user selection screen 400 as illustrated in FIG. 4A.

As described above, buttons for administrator users can be set to be hidden, whereby it is possible to perform display control so that the buttons for the administrator users are not displayed on the user selection screen 400 as in FIGS. 4B and 4C. Consequently, it is possible to prevent an unauthorized user from logging into the MFP 101 as an administrator user by pressing a button. If a user wishes to log into the MFP 101 as an administrator user in the state where the buttons for the administrator users are hidden, the user presses the "keyboard authentication" button 402 and inputs a user name and password through the user authentication screen 500. Accordingly, the user can log into the MFP 101. In this manner, it is possible to provide a general user with a simple login method, while providing an administrator user with an enhanced security login method.

<Processing Flow>

Figure 8:
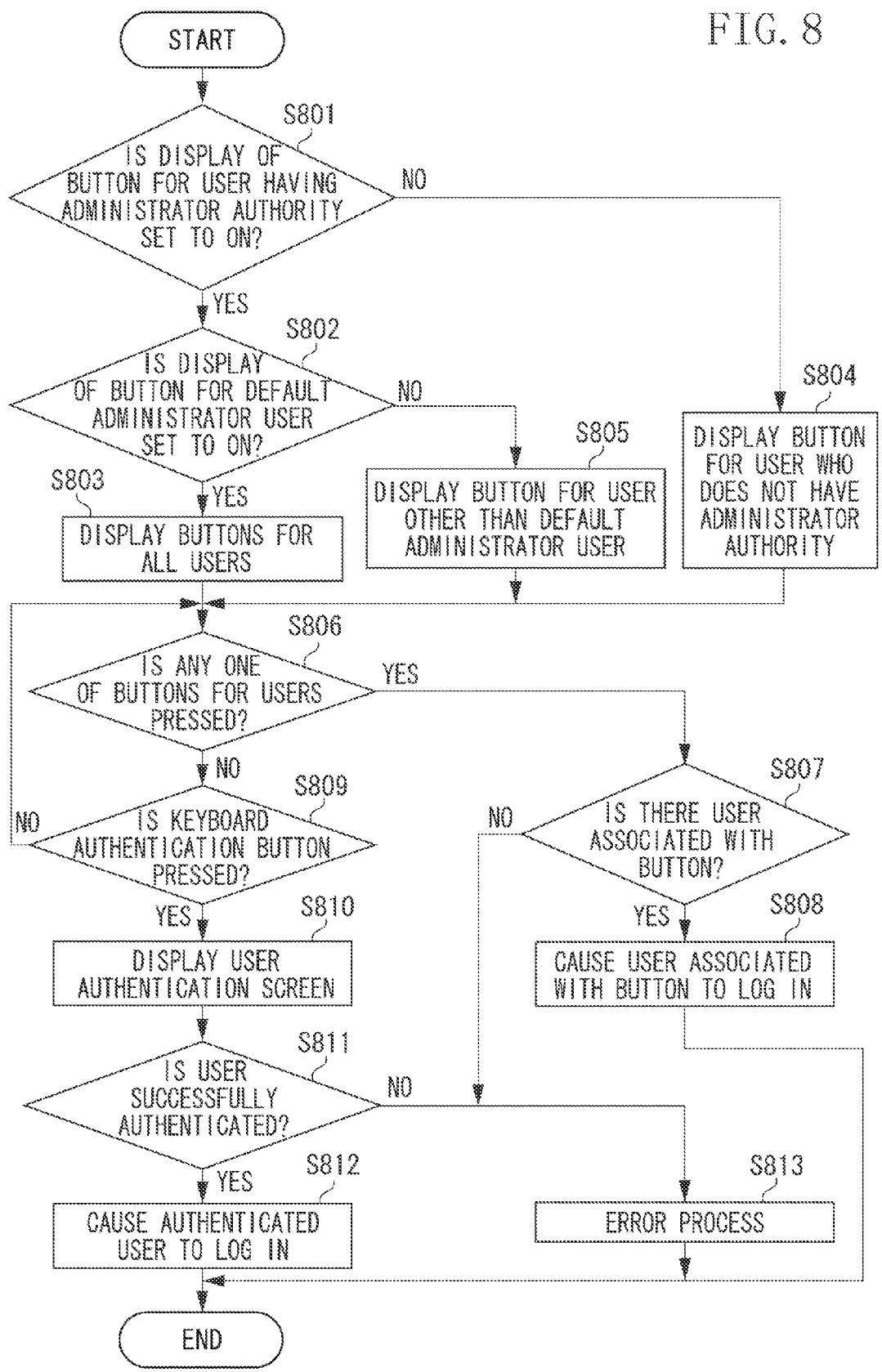
FIG. 8 is a flowchart illustrating processing from a start of the MFP to a user login process.

FIG. 8 is a flowchart illustrating processing from a start of the MFP 101 to a user login process. The procedure illustrated in this flowchart is stored in any one of storage units of the control unit 200, such as the RAM 203, the ROM 202, or the HDD 204, and executed by the CPU 201.

When the MFP 101 starts, according to a request from the local UI control unit 301, the user identification processing unit 302 starts a process of displaying the user selection screen 400 on the operation unit 209.

In step S801, the user identification processing unit 302 acquires setting values set through the setting screen 600 and saved in the HDD 204, and determines whether the display of a button for an administrator user is set to ON. If the display of a button corresponding to an administrator user is set to ON, then in step S802, the user identification processing unit 302 determines whether the display of the button for the default administrator user is set to ON. If the display of the button for the default administrator user is set to ON, then in step S803, the user identification processing unit 302 acquires all the user names from the user information stored in the user information storage unit 304. Then, the user identification processing unit 302 displays the buttons corresponding to all the users on the user selection screen 400 (FIG. 4A).

If the display of a button for an administrator user is set to OFF in step S801, then in step S804, the user identification processing unit 302 acquires, from the user information stored in the user information storage unit 304, the user name of a user where the role is not "Administrator". Then, the user identification processing unit 302 displays the button corresponding to the acquired user name on the user selection screen 400 (FIG. 4C).

If the display of the button for the default administrator user is not set to ON in step S802, then in step S805, the user identification processing unit 302 acquires from the user information storage unit 304 the user name of a user whose user name is not "Admin". Then, the user identification processing unit 302 displays the button corresponding to the acquired user name on the user selection screen 400 (FIG. 4B).

After displaying the user selection screen 400 on the operation unit 209 in the process of steps S803, S804, or S805, in steps S806 and S809, the user identification processing unit 302 waits until any one of the buttons 401 for the users is pressed or the "keyboard authentication" button 402 is pressed.

If it is determined in step S806 that any one of the buttons 401 for the users is pressed, then in step S807, the user identification processing unit 302 checks whether the user associated with the pressed button is present in the user information storage unit 304. If the user associated with the pressed button is present in the user information, then in step S808, the user identification processing unit 302 performs a login process for causing the user associated with the pressed button to log into the MFP 101. If the login process is completed, the user identification processing unit 302 requests the local UI control unit 301 to display the function selection screen 700, and the function selection screen 700 is displayed on the operation unit 209.

If it is determined that, on the user selection screen 400, none of the buttons 401 for the users is pressed, and the "keyboard authentication" button 402 is pressed (No in step S806 and Yes in step S809), then in step S810, the user authentication processing unit 303 displays the user authentication screen 500. If a user name and password are input through the user authentication screen 500, then in step S811, based on the input information, the user authentication processing unit 303 performs a process of authenticating the user. Specifically, the user authentication processing unit 303 compares a user name and password in the user information stored in the user information storage unit 304 with the user name and password input through the user authentication screen 500, thereby authenticating the user. If the user is successfully authenticated, then in step S812, the user authentication processing unit 303 performs a login process for causing the authenticated user to log into the MFP 101. If the login process is completed, the user authentication processing unit 303 requests the local UI control unit 301 to display the function selection screen 700, and the function selection screen 700 is displayed on the operation unit 209.

If the user name associated with the selected button is not present in the user information storage unit 304 in step S807, then in step S813, as an error process, the user identification processing unit 302 causes the operation unit 209 to indicate that the user is not present. Then, the processing ends. This step is executed in a case where, after the user selection screen 400 is displayed, information of the user is deleted externally via the LAN 100. Further, if the authentication of the user fails in step S811, then in step S813, the user authentication processing unit 303 causes the operation unit 209 to indicate that the authentication failed. Then, the processing ends.

The above processing is executed, whereby it is possible to flexibly control, according to the installation environment, whether to display or hide buttons for users having the administrator authority or the button for the default administrator user on the user selection screen 400. Buttons for administrator users are set to be hidden, thereby preventing a user from logging into the MFP 101 as an administrator by just selecting a button through the user selection screen 400. If a user wishes to log into the MFP 101 as an administrator, the user needs to input a user name and password of an administrator user through the user authentication screen 500, thereby authenticating the user. This process reduces the risk that a user who is not a proper administrator may change important settings of the MFP 101. In particular, there are many cases where the default administrator user can be distinguished only by the user name. Thus, the button for the default administrator user is set to be hidden, thus enhancing security. On the other hand, in an environment where such security is not required, buttons for administrator users are set to be displayed, whereby a user can log into the MFP 101 by just selecting a button for the user through the user selection screen 400 without distinction between an administrator user and a general user.

In the above description, a case was described where only a user name is displayed on each button 401 displayed on the user selection screen 400. Alternatively, an icon image may be displayed together with the user name. Further, a case was described where a user name included in the user information stored in the user information storage unit 304 is displayed as on each button 401. Alternatively, a display name to be displayed on a button can be set separately. For example, if an employee number is registered as a user name, it may be difficult for a user to distinguish the user's button by the employee number. Thus, it is effective to enable a display name to be set separately. Alternatively, the selection of a user may be allowed using a list on the user selection screen 400 instead of a button.

In the above description, a case was described where, after the MFP 101 starts, the user selection screen 400 is displayed, and after a user logs into the MFP 101, the function selection screen 700 is displayed. Alternatively, this order may be reversed. That is, after the MFP 101 starts, the function selection screen 700 may be displayed first. Then, after a user selects a function, the user selection screen 400 may be displayed. This is effective, for example, in a case where the MFP 101 is operated such that while anyone is allowed to use a copy function, only registered users are allowed to use a personal print function and/or a scan transmission function. In this case, if the "copy" button 701 is pressed on the function selection screen 700, the screen transitions to a copy setting screen without displaying the user selection screen 400. If another button is pressed, the user selection screen 400 can be displayed. Alternatively, it may be possible to switch, according to the setting of the MFP 101, between displaying either the user selection screen 400 first or the function selection screen 700 first.

Personal print was described above as an example of the personalization function. Alternatively, the MFP 101 may include other personalization functions, including but not limited to "screen to be displayed at time of login", "display language", "keyboard layout", or "accessibility setting" that can be set in advance for each user, and according to a user logged into the MFP 101, a screen based on the contents of the settings may be displayed. For example, if a user that "display language" is set to English logs into the MFP 101, the function selection screen 700 is displayed in English.

In the above exemplary embodiment(s), an image forming apparatus having a plurality of functions such as a copy function, a scanner function, and a print function has been described as an example. Aspects of the present invention, however, are also applicable to an image processing apparatus having only one or two of these functions. Alternatively, aspects of the present invention may be applied to other information processing apparatuses such as a personal computer, a personal digital assistant (PDA), a mobile phone, a fax, a camera, a video camera, or another image viewer.

As described above, the information processing apparatus according to the above exemplary embodiment(s) stores, as user information of a user capable of logging into the information processing apparatus, first user information of a user having particular authority and second user information of a user without the particular authority. Then, the information processing apparatus executes a login process for logging into the information processing apparatus using different methods. One method permits a user to log into the information processing apparatus by displaying a list of stored user information and logging, based on selection of user information from the list, the user corresponding to the selected user information into the information processing apparatus. Another method permits a user to log into the information processing apparatus by displaying an authentication screen for inputting information necessary for user authentication, authenticating a user based on information input through the authentication screen, and, logging the authenticated user into the information processing apparatus.

In the first method, since it is only necessary to select desired user information from the displayed user information, while operation is simple, a user can also log into the information processing apparatus as a user having particular authority, such as an administrator user. This may be undesirable for security depending on the installation environment. Thus user information of a user having such particular authority is excluded from being displayed, thereby preventing a user with the particular authority from logging into the information processing apparatus by the first method. However, a user with the particular authority is able to log into the information processing apparatus by the second method. Consequently, a user without particular authority is provided with a simplified login using the first method, while a user with particular authority is able to log into the information processing apparatus by the second method, which has higher security.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-138895, filed Jul. 10, 2015, which is hereby incorporated by reference herein in its entirety.

What is claimed is:

1. An information processing apparatus comprising:
a memory device that stores a set of instructions; and
at least one processor that executes the instructions to:
store in a storage unit, as user information of a user capable of logging into the information processing apparatus, first user information of a first user having particular authority and second user information of a second user having no particular authority,
wherein the particular authority is an authority to change particular settings of the information processing apparatus;
display a user selection screen on which at least a login instruction button for the second user is displayed and a login instruction button for the first user is not displayed; and
perform a login process that, according to selection of the login instruction button for the second user, enables the second user to log into the information processing apparatus.

2. The information processing apparatus according to claim 1,
wherein the at least one processor executes instructions in the memory device to:
make a setting about whether the login instruction button for the first user is to be displayed on the user selection screen,
display, in a case where a setting such that the login instruction button for the first user is to be displayed is made, a user selection screen on which at least the login instruction button for the second user is displayed and the login instruction button for the first user is displayed, and
display, in a case where a setting such that the login instruction button for the first user is not to be displayed is made, the user selection screen on which at least the login instruction button for the second user is displayed and the login instruction button for the first user is not displayed.

3. The information processing apparatus according to claim 2, wherein a setting is made so that only a login instruction button for, from among users capable of changing a particular setting regarding the information processing apparatus, a default administrator user registered in advance is not displayed on the user selection screen.

4. The information processing apparatus according to claim 1,
wherein the at least one processor executes instructions in the memory device to:
input authentication information for user authentication, and
in a case where authentication information of a user having the particular authority is input in a state where the first user information is not displayed in a list of user information, cause the user having the particular authority to log into the information processing apparatus.

5. The information processing apparatus according to claim 4, wherein the authentication information includes user identification information and a password of a user.

6. The information processing apparatus according to claim 4, wherein in a case where the user having the particular authority is caused to log into the information processing apparatus, a particular setting regarding the information processing apparatus can be changed.

7. The information processing apparatus according to claim 1, wherein information indicating authority of a user capable of logging into the information processing apparatus is stored in the storage unit, and
wherein, based on the information indicating authority of a user stored by the storage unit, the user selection screen is displayed.

8. The information processing apparatus according to claim 1,
wherein the at least one processor executes instructions in the memory device to:
based one the login process, provide a personalization function according to the user having logged into the information processing apparatus.

9. The information processing apparatus according to claim 8, wherein the at least one processor executes instructions in the memory device to:
provide a function of reserving a submitted print job, displaying a list of print jobs submitted by a user having logged into the information processing apparatus, receiving a print instruction from the user, and performing printing based on a print job for which the print instruction is received.

10. The information processing apparatus according to claim 1, wherein the at least one processor executes instructions in the memory device to:
perform control to execute a print process to print an image on a recording medium.

11. The information processing apparatus according to claim 1, wherein the at least one processor executes instructions in the memory device to:
perform control to execute a reading process to read an image on a document to generate image data.

12. A method for controlling an information processing apparatus including a storage unit configured to store, as user information of a user capable of logging into the information processing apparatus, first user information of a first user having particular authority and second user information of a second user having no particular authority, the method comprising:
displaying a user selection screen on which at least a login instruction button for the second user is displayed and a login instruction button for the first user is not displayed,
wherein the particular authority is an authority to change particular settings of the information processing apparatus; and
performing a login process that, according to selection of the login instruction button for the second user, enables the second user to log into the information processing apparatus.

13. A non-transitory computer readable storage medium storing computer readable instructions that cause a computer to execute a method to control an information processing apparatus including a storage unit configured to store, as user information of a user capable of logging into the computer, first user information of a first user having particular authority and second user information of a second user having no particular authority, the method comprising:

displaying a user selection screen on which at least a login instruction button for the second user is displayed and a login instruction button for the first user is not displayed; and performing a login process that, according to selection of the login instruction button for the second user, enables the second user to log into the information processing apparatus, wherein the particular authority is an authority to change particular settings of the information processing apparatus.

14. An information processing apparatus comprising:

a memory device that stores a set of instructions; and at least one processor that executes the instructions to:

store in a storage unit, as user information of a user having an authority to log into the information processing apparatus, first user information of a first user who has particular authority and second user information of a second user who does not have the particular authority, wherein the particular authority is an authority to change particular settings of the information processing apparatus;

display, on a user selection screen, a list of one or more login instruction items corresponding to one or more users whose user information is stored in the storage unit;

perform a login process that, according to selection of a login instruction item, enables a user corresponding to the selected login instruction item to log into the information processing apparatus; and set a setting so that a login instruction item for the second user is displayed and a login instruction item for the first user is not displayed on the user selection screen.

15. An information processing apparatus according to claim 14, wherein the setting is made so that only a login instruction button for, from among users having an authority of changing a particular setting regarding the information processing apparatus, a default administrator user registered in advance is not displayed on the user selection screen.

16. The information processing apparatus according to claim 14, wherein the user information includes user identification information and a password of a user.

17. A method for controlling an information processing apparatus including a storage unit configured to store, as user information of a user capable of logging into the information processing apparatus, first user information of a first user who has particular authority and second user information of a second user who does not have particular authority, the method comprising:

displaying, on a user selection screen, a list of one or more login instruction items corresponding to one or more users whose user information is stored in the storage unit;

performing a login process that, according to selection of a login instruction item, enables a user corresponding to the selected login instruction item to log into the information processing apparatus; and setting a setting so that a login instruction item for the second user is displayed and a login instruction item for the first user is not displayed on the user selection screen, wherein the particular authority is an authority to change particular settings of the information processing apparatus.

18. A non-transitory computer readable storage medium storing computer readable instructions that cause a computer to execute a method to control an information processing apparatus including a storage unit configured to store, as user information of a user capable of logging into the computer, first user information of a first user who has particular authority and second user information of a second user who does not have particular authority, the method comprising:

displaying, on a user selection screen, a list of one or more login instruction items corresponding to one or more users whose user information is stored in the storage unit;

performing a login process that, according to selection of a login instruction item, enables a user corresponding to the selected login instruction item to log into the information processing apparatus; and setting a setting so that a login instruction item for the second user is displayed and a login instruction item for the first user is not displayed on the user selection screen, wherein the particular authority is an authority to change particular settings of the information processing apparatus.

* * * * *